US007248652B2

(12) United States Patent
Sayeed (10) Patent No.: US 7,248,652 B2
(45) Date of Patent: Jul. 24, 2007

(54) METHOD AND APPARATUS FOR RECOVERING TIMING INFORMATION IN ORTHOGONAL FREQUENCY DIVISION MULTIPLEXING (OFDM) SYSTEMS

(75) Inventor: Zulfiquar Sayeed, East Windsor, NJ (US)

(73) Assignee: Agere Systems Inc., Allentown, PA (US)

( * ) Notice: Subject to any disclaimer, the term of this patent is extended or adjusted under 35 U.S.C. 154(b) by 1207 days.

(21) Appl. No.: 09/795,727

(22) Filed: Feb. 28, 2001

(65) Prior Publication Data

US 2002/0150181 A1 Oct. 17, 2002

(51) Int. Cl.
*H04L 27/06* (2006.01)
(52) U.S. Cl. ...................... 375/343; 375/355
(58) Field of Classification Search ............... 375/324, 375/326, 340, 342, 343, 355, 362, 365, 368; 370/203, 208, 210, 326, 509, 512, 514
See application file for complete search history.

(56) References Cited

U.S. PATENT DOCUMENTS

| | | | | |
|---|---|---|---|---|
| 5,373,507 | A * | 12/1994 | Skold | 370/350 |
| 5,694,389 | A * | 12/1997 | Seki et al. | 370/208 |
| 6,035,003 | A * | 3/2000 | Park et al. | 375/326 |
| 6,160,821 | A * | 12/2000 | Dolle et al. | 370/509 |
| 6,373,861 | B1 * | 4/2002 | Lee | 370/503 |
| 6,424,673 | B1 * | 7/2002 | Chen et al. | 375/149 |
| 6,438,183 | B1 * | 8/2002 | Taura et al. | 375/343 |

(Continued)

OTHER PUBLICATIONS

U.S. Appl. No. 09/398,502, filed Sep. 17, 1999, entitled "Method and Apparatus for Performing Differential Modulation Over Frequency in an Orthogonal Frequency Division Multiplexing (OFDM) Communication System."

(Continued)

*Primary Examiner*—Khanh Tran (57) ABSTRACT

An improved OFDM receiver is disclosed that repositions peaks in an OFDM frame to a desired position away from the frame boundary to reduce the probability of timing ambiguity. Each OFDM frame is divided into at least two windows during an acquisition mode to identify the index within each window having the maximum correlation. The improved timing acquisition of the present invention permits the Fast Fourier Transform (FFT) operation to operate on the correctly aligned symbol for improved accuracy. In addition, the present invention provides improved mechanisms for declaring when timing is acquired or when timing has been lost. In one implementation, the peaks are shifted from the frame boundary to the center of the OFDM frame, thereby removing the ambiguity of whether a given peak is associated with a previous or subsequent frame. A timing FSM processes a number of timing estimates to determine when the timing information has been acquired and shifts the OFDM signal, as necessary, to maintain the peak in the desired position during a tracking mode. The timing FSM determines that timing acquisition is completed if a timing estimate does not shift by more than a guard interval for a predefined timing acquisition length. After a predefined inter-mode settling period, the timing FSM will transition to a tracking mode. If the differences between the estimated times and the desired position of the OFDM frame are consistently greater than the length of the guard interval, then a loss of tracking is achieved and the timing FSM will return to an acquisition mode.

37 Claims, 6 Drawing Sheets

U.S. PATENT DOCUMENTS 6,567,374 B1 * 5/2003 Bohnke et al. ............. 370/203
6,594,320 B1 * 7/2003 Sayeed ...................... 375/281
6,735,255 B1 * 5/2004 Smart et al. ................ 375/260
6,771,591 B1 * 8/2004 Belotserkovsky et al. .. 370/210
6,785,349 B1 * 8/2004 Rosenlof et al. ........... 375/343

OTHER PUBLICATIONS

J. van de Beek et al., "A Time and Frequency Synchronization Scheme for Multiuser OFDM," IEEE Journal on Selected Areas in Communications, vol. 17, No. 11 (Nov. 1999).

* cited by examiner

METHOD AND APPARATUS FOR RECOVERING TIMING INFORMATION IN ORTHOGONAL FREQUENCY DIVISION MULTIPLEXING (OFDM) SYSTEMS

CROSS-REFERENCE TO RELATED APPLICATIONS

The present invention is related to U.S. patent application Ser. No. 09/398,502, filed Sep. 17, 1999, entitled "Method and Apparatus for Performing Differential Modulation Over Frequency in an Orthogonal Frequency Division Multiplexing (OFDM) Communication System," assigned to the assignee of the present invention and incorporated by reference herein.

FIELD OF THE INVENTION

The present invention relates to wireless communication systems, and more particularly, to methods and apparatus for recovering timing estimates in an orthogonal frequency division multiplexing (OFDM) communication system.

BACKGROUND OF THE INVENTION

Satellite broadcasting systems for transmitting programming content have become increasingly popular in many parts of the world. Direct Broadcasting Satellite (DBS) systems transmit television programming content, for example, to a geo-stationary satellite, which broadcasts the content back to the customers. In such a wireless broadcast environment, the transmitted programming can be received by anyone with an appropriate receiver, such as an antenna or a satellite dish.

In addition, a number of satellite broadcasting systems have been proposed or suggested for broadcasting audio programming content from geo-stationary satellites to customers in a large coverage area, such as the continental United States. Proposed systems for providing digital audio broadcasting (DAB), for example, are expected to provide near CD-quality audio, data services and more robust coverage than existing analog FM transmissions. Satellite broadcasting systems for television and radio content provide potentially national coverage areas, and thus improve over conventional terrestrial television stations and AM/FM radio stations that provide only regional coverage.

Satellite broadcasting systems transmit digital music and other information from an uplink station to one or more mobile receivers. Satellite broadcasting systems typically include a plurality of satellites and terrestrial repeaters operating in a broadcast mode. The satellites are typically geo-stationary, and are located over a desired geographical coverage area. The terrestrial repeaters typically operate in dense urban areas, where the direct line of sight (LOS) between the satellites and the mobile receiver can be blocked due to the angle of elevation and shadowing by tall buildings.

Orthogonal frequency division multiplexing (OFDM) techniques have also been proposed for use in such satellite broadcasting systems and other wireless networks. In an OFDM communication system, the digital signal is modulated to a plurality of small sub-carrier frequencies that are then transmitted in parallel. It has been found that OFDM communication systems do not require complex equalizers, even at high data rates and under multipath propagation conditions. Among other benefits, OFDM communication systems provide a guard interval that absorbs the multipath distortion into the guard interval duration. As long as the arrival times of the multipath signals differ from one another by less than the guard interval, an equalizer is not necessary.

Figure 1:
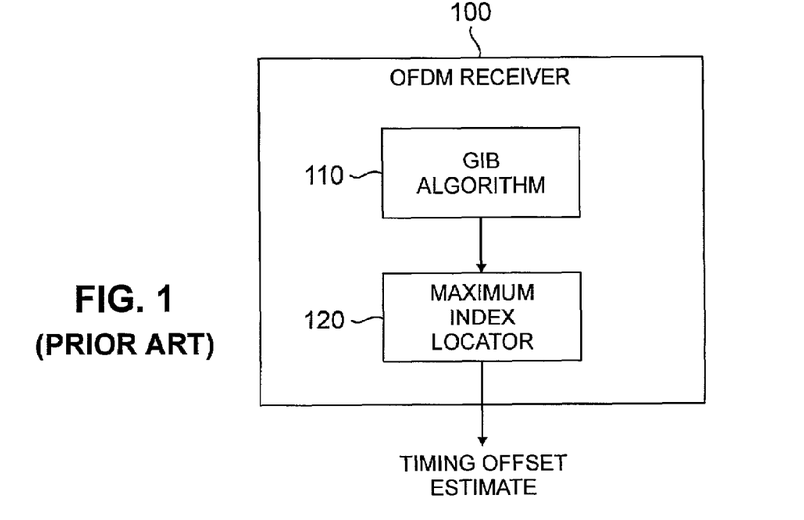
FIG. 1 is a schematic block diagram illustrating portions of a conventional OFDM receiver directed to timing recovery.

An OFDM receiver must perform timing acquisition and tracking to process data properly. FIG. 1 illustrates portions of a conventional OFDM receiver 100 directed to timing recovery. The OFDM receiver 100 implements a known Guard Interval Based (GIB) algorithm 110 that recovers timing information from the received signal. For a more detailed discussion of the GIB timing recovery algorithm 110, see, for example, Jan-Jaap van de Beek et al., ML Estimation of Time and Frequency Offset in OFDM Systems, IEEE Transactions on Signal Processing, Vol. 45, No 7, 1800-05 (July 1997) or Jan-Jaap van de Beek et al., "A Time and Frequency Synchronization Scheme for Multiuser OFDM," IEEE J. on Selected Areas in Communications, Vol. 17, No. 11, 1900-14, (November 1999), each incorporated by reference herein.

Figure 2:
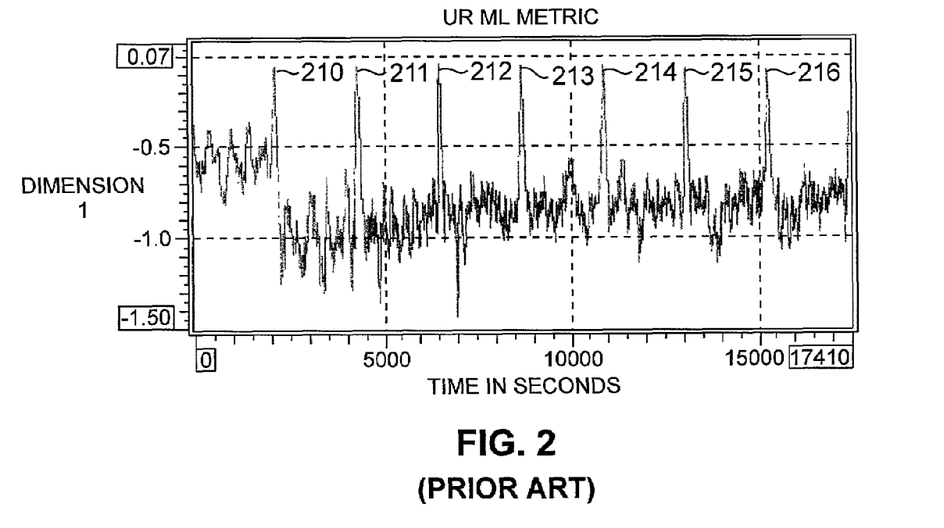
FIG. 2 illustrates a maximum likelihood (ML) metric for an OFDM signal.

Generally, the GIB timing recovery algorithm 110 employed by the OFDM receiver 100 identifies peaks in the maximum likelihood (ML) metric 200, shown in FIG. 2. Each peak, such as the peaks 210-216, in the ML metric 200 corresponds to the start of each OFDM frame. The peaks are present because the received samples are heavily correlated at a lag corresponding to the useful symbol duration. The timing information is extracted by a maximum index locator 120 that locates the index of the maximum correlation value in a buffer having a size corresponding to the number of samples in the OFDM frame.

While the GIB algorithm performs effectively for many applications, it suffers from a number of limitations, which if overcome, could greatly expand the reliability and accuracy of OFDM receivers. For example, since each peak 210-216 in the ML metric 200 occurs at the frame boundary and, in a dispersive channel, such as under multipath conditions, the peaks will not be ideal impulses, a given peak may start in one frame, extend over the frame boundary and end in the next frame. Thus, a maximum correlation value associated with the peak may be assigned an index at the end of the prior frame or the beginning of the next frame, causing ambiguities in the identification of frame boundaries.

A need therefore exists for improved techniques for performing timing acquisition and tracking in an OFDM receiver. A further need exists for a method and apparatus for performing timing acquisition and tracking in an OFDM receiver that overcomes the problems that are inherent when the symbol time is close to the frame boundary. Yet another need exists for a method and apparatus for performing timing acquisition and tracking in an OFDM receiver that declares when timing has been acquired or when timing has been lost.

SUMMARY OF THE INVENTION

Generally, an improved OFDM receiver is disclosed that performs timing acquisition and tracking in a manner that overcomes the above-described problems that are inherent when the symbol time is close to the frame boundary. According to one aspect of the invention, the OFDM received repositions the peaks in the ML metric to a desired position away from the frame boundary to reduce the probability of timing ambiguity. According to another aspect of the invention, each OFDM frame is divided into at least two windows during an acquisition mode in order to identify the index within each window having the maximum correlation. The improved timing acquisition of the present invention permits the Fast Fourier Transform (FFT) operation to operate on the correctly aligned symbol for improved accuracy. In addition, the present invention provides improved mechanisms for declaring when timing is acquired or when timing has been lost.

An OFDM receiver in accordance with the present invention implements the GIB algorithm to recover timing information from the received signal. The GIB timing recovery algorithm identifies peaks in the maximum likelihood (ML) metric in a known manner. Thereafter, the present invention repositions each peak away from the frame boundary in order to perform improved timing acquisition and tracking. In one implementation, the peaks are shifted from the frame boundary to the center of the OFDM frame, thereby removing the ambiguity of whether a given peak is associated with a previous or subsequent frame. Peaks are shifted in accordance with the present invention by inserting or deleting samples, as necessary, into each OFDM frame.

The present invention divides each OFDM frame into at least two windows during an acquisition mode. In one implementation, each OFDM frame is divided into two windows and an index corresponding to the maximum correlation value in each window is selected, as well as an index corresponding to the maximum correlation value in the overall OFDM frame to generate three timing estimate values, namely, $tim_0$, $tim_1$ and $tim_{full}$. The variables $tim_0$ and $tim_1$ are the indices for the maximum correlation in a first window and a second window of the OFDM frame, respectively, and the variable $tim_{full}$ indicates the index for the maximum correlation in the full OFDM frame. The timing estimates $tim_0$ and $tim_1$ are evaluated during an acquisition mode to more accurately identify the ML metric peak. The timing estimate $tim_{full}$ is evaluated during the tracking mode to maintain the timing alignment with a specified desired position.

According to another aspect of the invention, the timing estimates, $tim_0$, $tim_1$ and $tim_{full}$, are applied to a timing finite state machine (FSM) that determines when the timing information has been acquired and shifts the OFDM signal, as necessary, to maintain the peak in the desired position during a tracking mode. For every OFDM frame, the timing FSM compares the timing estimates from the GIB algorithm with the previous time estimates for the previous frame. If the differences are less than the length of the guard interval consecutively for a predefined timing acquisition length, then timing acquisition is completed. After a predefined inter-mode settling period, the timing FSM will transition to a tracking mode. If the differences between the estimated times and the desired position of the OFDM frame are consistently greater than the length of the guard interval, then a loss of tracking is achieved and the timing FSM will return to an acquisition mode.

A more complete understanding of the present invention, as well as further features and advantages of the present invention, will be obtained by reference to the following detailed description and drawings.

DETAILED DESCRIPTION

Figure 3:
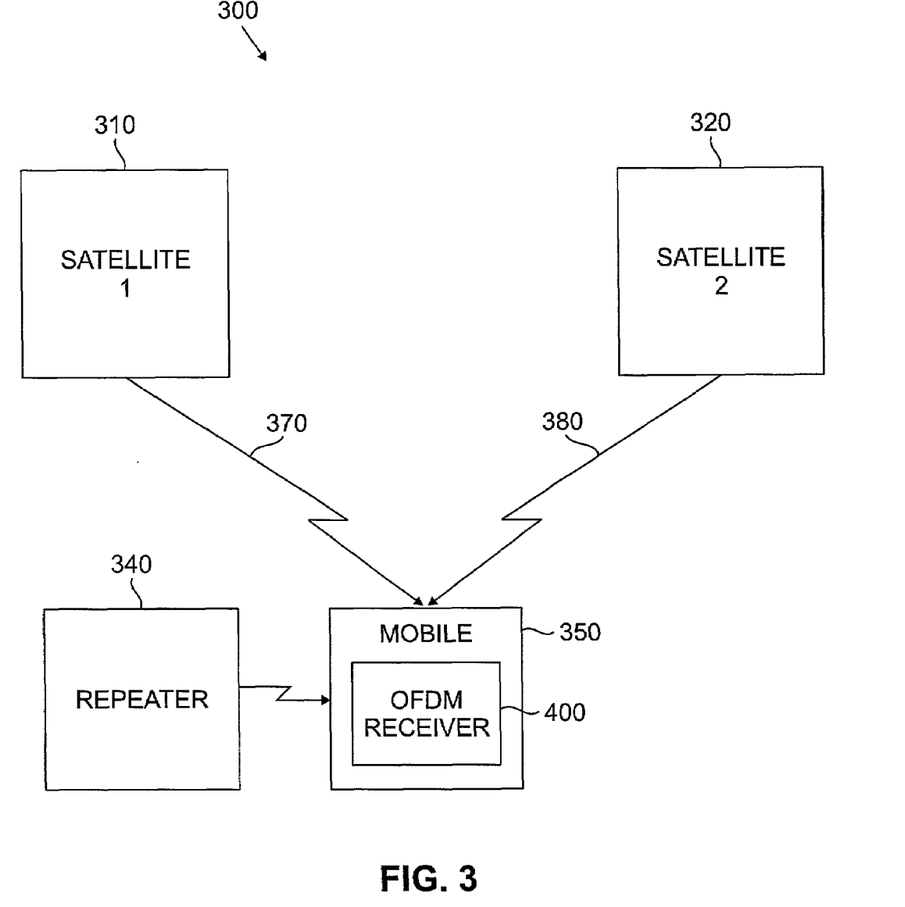
FIG. 3 illustrates a satellite transmission system in which the present invention can operate.

FIG. 3 illustrates a satellite transmission system 300 in which the present invention can operate. The satellite transmission system 300 can transmit digital music or other information from an up-link station (not shown) to one or more mobile receivers, such as the mobile receiver 350. As shown in FIG. 3, the illustrative satellite transmission system 300 includes two satellites 310, 320 operating in a broadcast mode. The satellites 310, 320 are designed to be geo-stationary, and are located over a desired geographical coverage area, such as over the eastern and western United States, at appropriate angles of elevation, as dictated by the requirements of a geo-stationary system. In one embodiment, the satellites 310, 320 are implemented as conventional time division multiplexed (TDM) transmitters.

In addition, the satellite transmission system 300 includes a plurality of terrestrial repeaters, such as the terrestrial repeater 340, that will operate in dense urban areas, where the direct line of sight (LOS) between the satellites 310, 320 and the mobile receiver 350 can be blocked due to the angle of elevation and shadowing by tall buildings. The terrestrial repeaters 340 are implemented as OFDM transmitters to minimize the channel impairments caused by multi-path propagation. Although described in connection with an exemplary wireless OFDM communication system, it will be understood that the present invention is equally applicable to a wired discrete multi-tone (DMT) communication system. The illustrative OFDM terrestrial repeaters 340 can optionally differentially encode the transmitted signal over frequency, as opposed to time. Thus, the differential encoding can be performed with respect to consecutive bins (sub-carriers) in the OFDM system bins in order to avoid channel phase distortion. For a more detailed discussion of an OFDM transmission system that differentially encodes the transmitted signal over frequency, as opposed to time, see, U.S. patent application Ser. No. 09/398,502, filed Sep. 17, 1999, entitled "Method and Apparatus for Performing Differential Modulation Over Frequency in an Orthogonal Frequency Division Multiplexing (OFDM) Communication System," assigned to the assignee of the present invention and incorporated by reference herein.

The satellites 310, 320 receive the broadcast signal, e.g., from a studio, over a robust radio frequency (RF) link, and the satellites 310, 320 will broadcast the signal after down-converting the signal to the carrier frequency. The terrestrial repeaters 340 retrieve the information directly from an up-link studio (not shown), using well-known technical means, such as wireline or microwave links, or from a dedicated satellite (not shown). In the illustrative implementation, the terrestrial repeaters 340 receive the information directly from the studio.

OFDM Signal

In the illustrative embodiment, each OFDM symbol of duration Ts will be composed of 2048 samples corresponding to the useful symbol duration and 184 samples corresponding to the guard interval, and the symbol represents up to 2048 sub-carriers each spaced 4 kHz apart ($\Delta f$). The useful OFDM symbol duration, Tu, illustratively equals 250 mu-sec and the guard interval duration or cyclic prefix duration, Tg, illustratively equals 22.46 mu-sec. The duration of the symbol, Ts, is 272.46 mu-sec, where Ts equals Tu plus Tg. The inter-carrier spacing, $\Delta f$, of 4 KHz is equal to the inverse of the useful symbol duration (1/Tu).

OFDM Timing Acquisition and Tracking

According to one feature of the present invention, each OFDM receiver repositions the peaks in the ML metric 200, such as the peaks 210-216 (FIG. 2), at a desired position away from the frame boundary in order to perform improved timing acquisition and tracking. According to another feature of the present invention, each OFDM frame is divided into at least two windows in order to identify the index within each window having the maximum correlation. In this manner, the OFDM receiver can properly acquire the timing so that the Fast Fourier Transform (FFT) can operate on the correctly aligned symbol. Generally, this timing estimate must be free from any ambiguity that is larger than the guard interval duration. In addition, the timing must be properly tracked so that the FFT receives properly aligned symbols. The tracking position is moved from the frame boundary so that the probability of timing ambiguity is minimized. In addition, the present invention provides improved mechanisms for declaring when timing is acquired or when timing has been lost.

Figure 4:
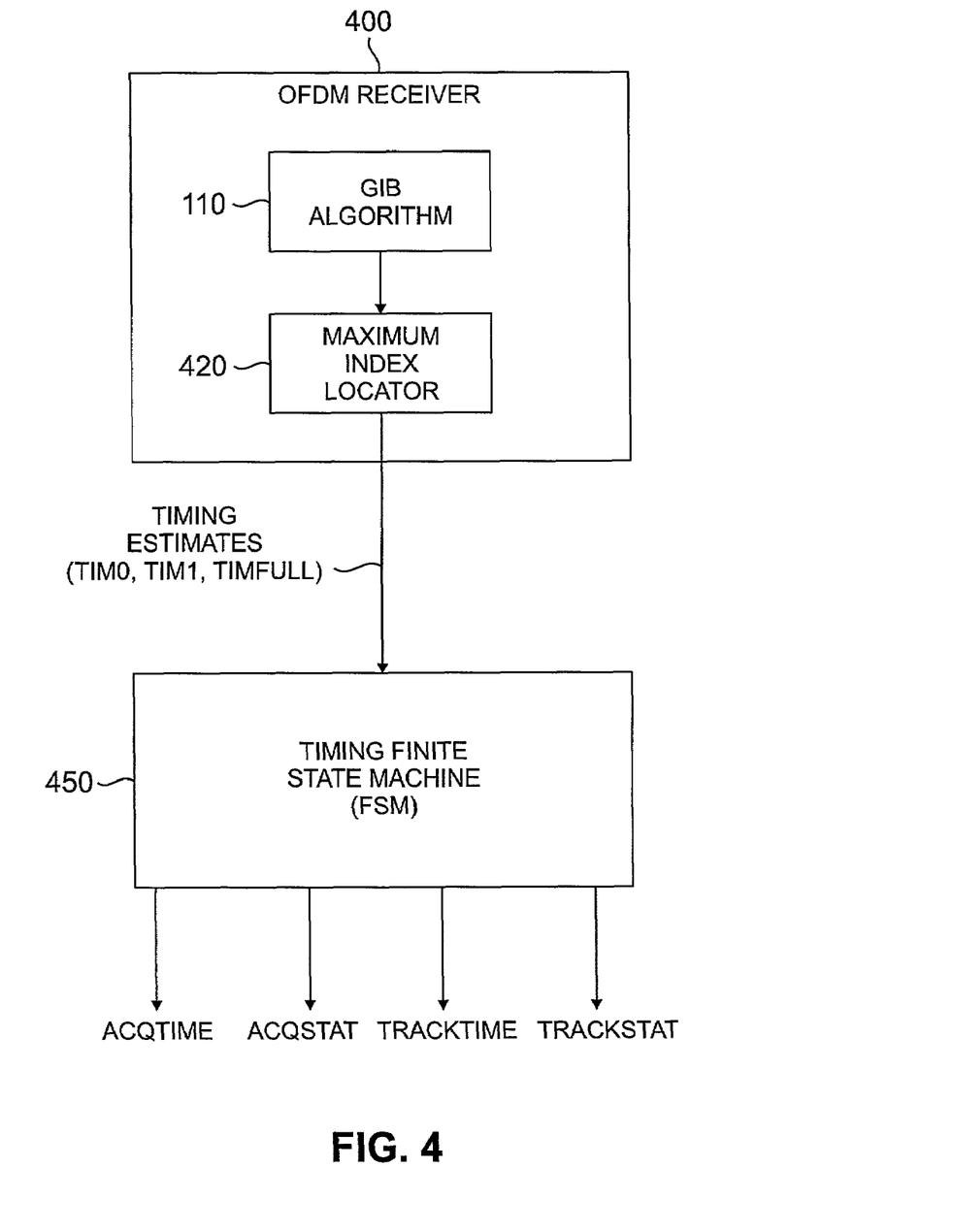
FIG. 4 is a schematic block diagram illustrating portions of an OFDM receiver in accordance with the present invention that are directed to timing recovery.

FIG. 4 illustrates portions of an OFDM receiver 400 in accordance with the present invention that are directed to timing recovery. The OFDM receiver 400 implements the well-known Guard Interval Based (GIB) algorithm 110, as discussed above, that recovers timing information from the received signal. For a more detailed discussion of the GIB timing recovery algorithm 110, see, for example, Jan-Jaap van de Beek et al., ML Estimation of Time and Frequency Offset in OFDM Systems, IEEE Transactions on Signal Processing, Vol. 45, No 7, 1800-05 (July 1997) or Jan-Jaap van de Beek et al., "A Time and Frequency Synchronization Scheme for Multiuser OFDM," IEEE J. on Selected Areas in Communications, Vol. 17, No. 11, 1900-14, (November 1999), each incorporated by reference herein.

As previously indicated, the GIB timing recovery algorithm 110 identifies peaks in the maximum likelihood (ML) metric 200, shown in FIG. 2. The present invention repositions each peak, such as the peaks 210-216 (FIG. 2), away from the frame boundary in order to perform improved timing acquisition and tracking. In the illustrative embodiment described herein, the peaks are shifted from the frame boundary to the center of the OFDM frame, thereby removing the ambiguity of whether a given peak is associated with a previous or subsequent frame. As discussed further below, peaks are shifted by inserting or deleting samples, as necessary, into each OFDM frame. As shown in FIG. 4, the timing information is extracted from the GIB algorithm 110 by a maximum index locator 420 that locates indices having maximum correlation values. For a discussion of alternatives to the GIB algorithm, see Kim et al., Performance Comparison of the Frequency Detectors for Orthogonal Frequency Division Multiplexing, IEEE Trans. Consumer Electronics, Vol. 43, No. 3, 776: 783 (August 1997), incorporated by reference herein.

In the illustrative embodiment, each OFDM frame is divided into two windows and an index corresponding to the maximum correlation value in each window is selected, as well as an index corresponding to the maximum correlation value in the overall OFDM frame. Thus, as shown in FIG. 4, the illustrative maximum index locator 420 generates three timing estimate values, namely, $\text{tim}_0$, $\text{tim}_1$ and $\text{tim}_{full}$. The variables $\text{tim}_0$ and $\text{tim}_1$ are the indices for the maximum correlation in a first window and a second window of the 2232-sample buffer, respectively. Finally, the variable $\text{tim}_{full}$ indicates the index for the maximum correlation in the 2232-sample buffer.

The timing estimates, $\text{tim}_0$, $\text{tim}_1$ and $\text{tim}_{full}$, are applied to a timing finite state machine (FSM) 450, discussed below in conjunction with FIGS. 6 and 7, that determines when the timing information has been acquired and shifts the OFDM signal, as necessary, to maintain the peak in the desired position during a tracking mode. In the illustrative embodiment, each peak is maintained in the center position of the OFDM frame (sample position 1116). As discussed further below, the timing FSM 450 provides reliable transitions between the acquisition and tracking modes of operation.

Generally, during the acquisition mode, the timing FSM 450 sets the variable acquisition status, ACQSTAT, to a binary value of one (1) for one frame when the delete/add stage 630 (FIG. 6, discussed below) is active. In addition, the timing FSM 450 aligns the peak of the correlated OFDM signal with the desired position of the OFDM frame, DesiredPos (the central position, 1116, in the illustrative embodiment) using the variable ACQTIME. The desired position is selected such that after acquisition the ideal timing instant will be positioned away from the frame boundary, thus minimizing edge ambiguities. For every OFDM frame, the timing FSM 450 also compares the time estimates from the GIB algorithm 110 with the previous time estimates for the previous frame. If the differences are less than the length of the guard interval consecutively for a predefined timing acquisition length, TacqLen, such as five (5) frames in the illustrative embodiment, then timing acquisition is completed. After a predefined inter-mode settling period, the timing FSM will transition to a tracking mode.

Similarly, during the tracking mode, the timing FSM 450 sets the variable tracking status, TRACKSTAT, to a binary value of one (1). While in the tracking mode, the timing FSM 450 compares the estimated times with the desired position of the OFDM frame, DesiredPos (sample position 1116). For every OFDM frame, the timing FSM 450 also compares the time estimates from the GIB algorithm 110 with the previous time estimates for the previous frame. The peak of the correlated OFDM signal is maintained in the desired position of the OFDM frame, DesiredPos, using the variable TRACKTIME. If the differences between the estimated times and the desired position of the OFDM frame are consistently greater than the length of the guard interval, then a loss of tracking is achieved and the timing FSM 450 will return to an acquisition mode.

Figure 5A:
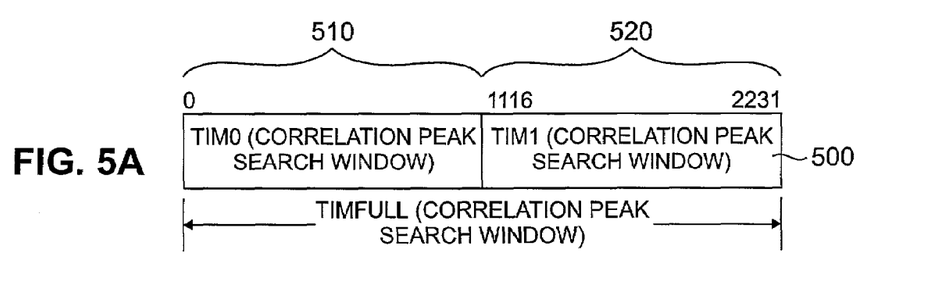
FIGS. 5A, 5B and 5C illustrate a sliding window correlation of the GIB algorithm and the selection of the maximum values by a maximum index locator of FIG. 4 in accordance with one embodiment of the present invention.
Figure 5B:
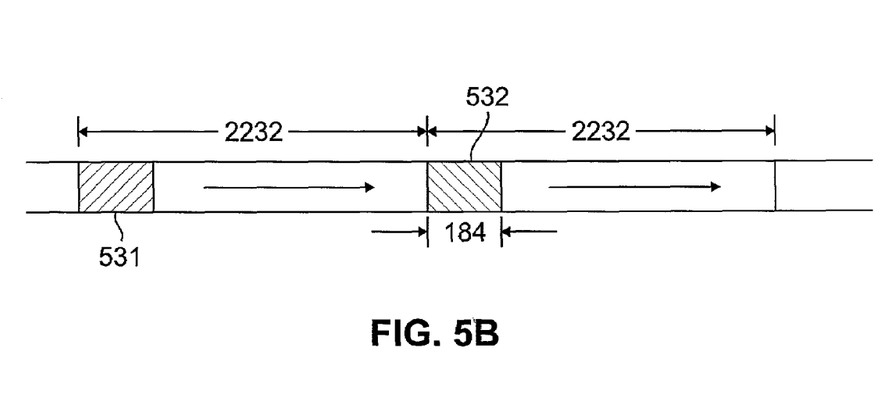
Figure 5C:
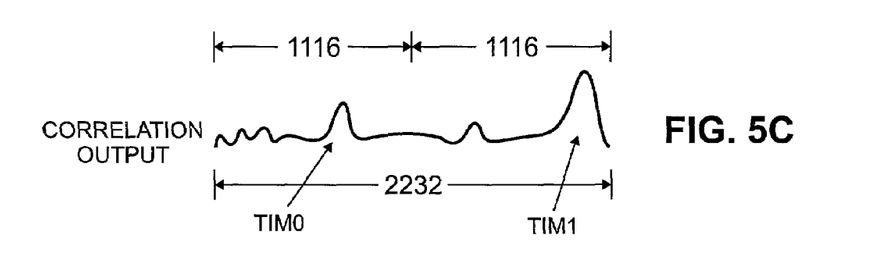

FIGS. 5A, 5B and 5C illustrate the sliding window correlation of the GIB algorithm 110, and the selection of the maximum values by the maximum index locator 420 in accordance with an illustrative embodiment of the present invention. As previously indicated, the samples processed by the GIB algorithm 110 are heavily correlated at a lag of the useful symbol duration (2048 samples in the illustrative implementation). This correlation is accomplished by the moving average blocks in the GIB algorithm 110 that generate the sum of the most recent 184 samples fed to the moving average blocks (not shown). The timing information is extracted by locating indices of the maximum correlation value in various windows of a buffer that is 2232 samples wide.

As shown in FIG. 5A, each OFDM frame 500 consisting of 2232 samples in the illustrative embodiment (2048 active samples, and a guard interval of 184 samples), is divided into a first window 510 and a second window 520. The timing estimate $tim_0$ is the index for the maximum correlation in the first window 510 of the 2232-sample buffer. The timing estimate $tim_1$ is the index for the maximum correlation in the second window 520 of the 2232-sample buffer. Finally, the timing estimate $tim_{full}$ indicates the index for the maximum correlation in full 2232-sample buffer corresponding to the entire OFDM frame. FIG. 5B illustrates the correlation of the 184 guard interval samples 531, 532 in two subsequent OFDM frames. Each 184 guard interval sample 531, 532 is 2232 samples apart. The correlation process is repeated to get the 2232 sample correlation output, as shown in FIG. 5C.

Figure 6:
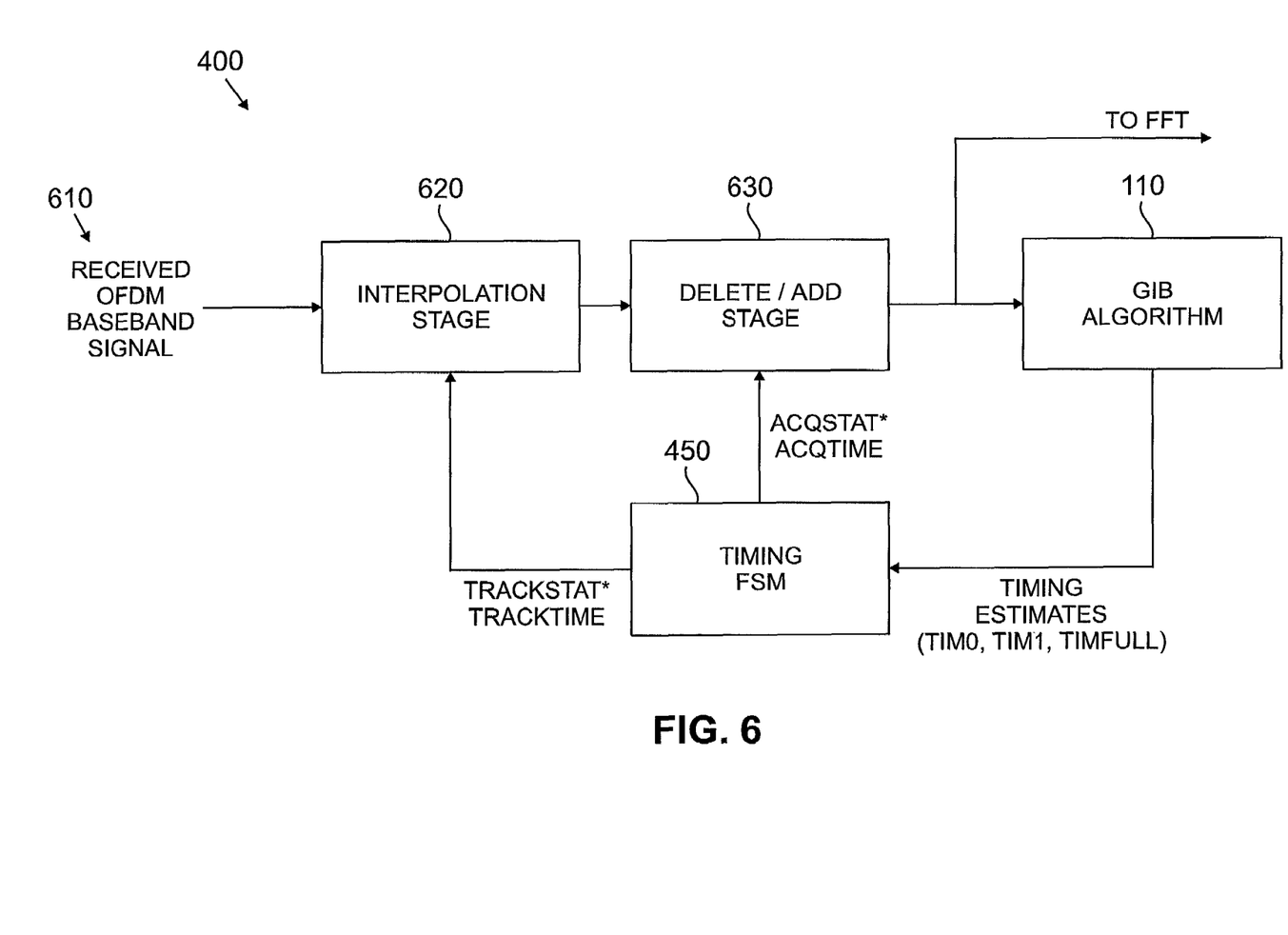
FIG. 6 is a schematic block diagram illustrating the timing control mechanism for the OFDM receiver shown in FIG. 4.

FIG. 6 is a schematic block diagram illustrating the timing control mechanism for the OFDM receiver 400 shown in FIG. 4. As shown in FIG. 6, the OFDM receiver 400 receives an OFDM baseband signal 610 at an illustrative rate of 30M samples/second. The interpolation block 620 uses the time tracking signal generated by the timing FSM 450 during the tracking mode to simultaneously adjust the timing (maintain alignment with desired position, DesiredPos) and downsample the signal to twice the oversampling rate. During the acquisition mode, the value of the TRACKSTAT value is 0, so the interpolation block 620 is inactive. During the tracking mode, however, the value of the TRACKSTAT value is 1, so the interpolation block 620 serves to shift the peak in accordance with the number of samples indicated by the variable, TRACKTIME.

The add/delete block 630 is used during the acquisition mode only for acquisition or re-acquisition purposes. The number of samples that are added to or deleted from the sample stream by the add/delete block 630 is dictated by the timing estimate after the acquisition is complete, discussed below, in accordance with the variable ACQTIME. During the tracking mode, the value of the ACQSTAT variable is 0, so the add/delete block 630 is inactive. During the acquisition mode, however, the value of the ACQSTAT value is 1 for one frame while the add/delete block 630 is active, so the add/delete block 630 serves to shift the peak to the desired position, DesiredPos, in accordance with the number of samples indicated by the variable, ACQTIME. The following table summarizes the values of the status bits during the various operating modes:

|  | ACQSTAT | TRACKSTAT |
|---|---|---|
| Acquisition Mode | 1 (for 1 frame, otherwise 0) | 0 |
| Inter-Mode Settling Period | 0 | 0 |
| Tracking Mode | 0 | 1 |

Figure 7:
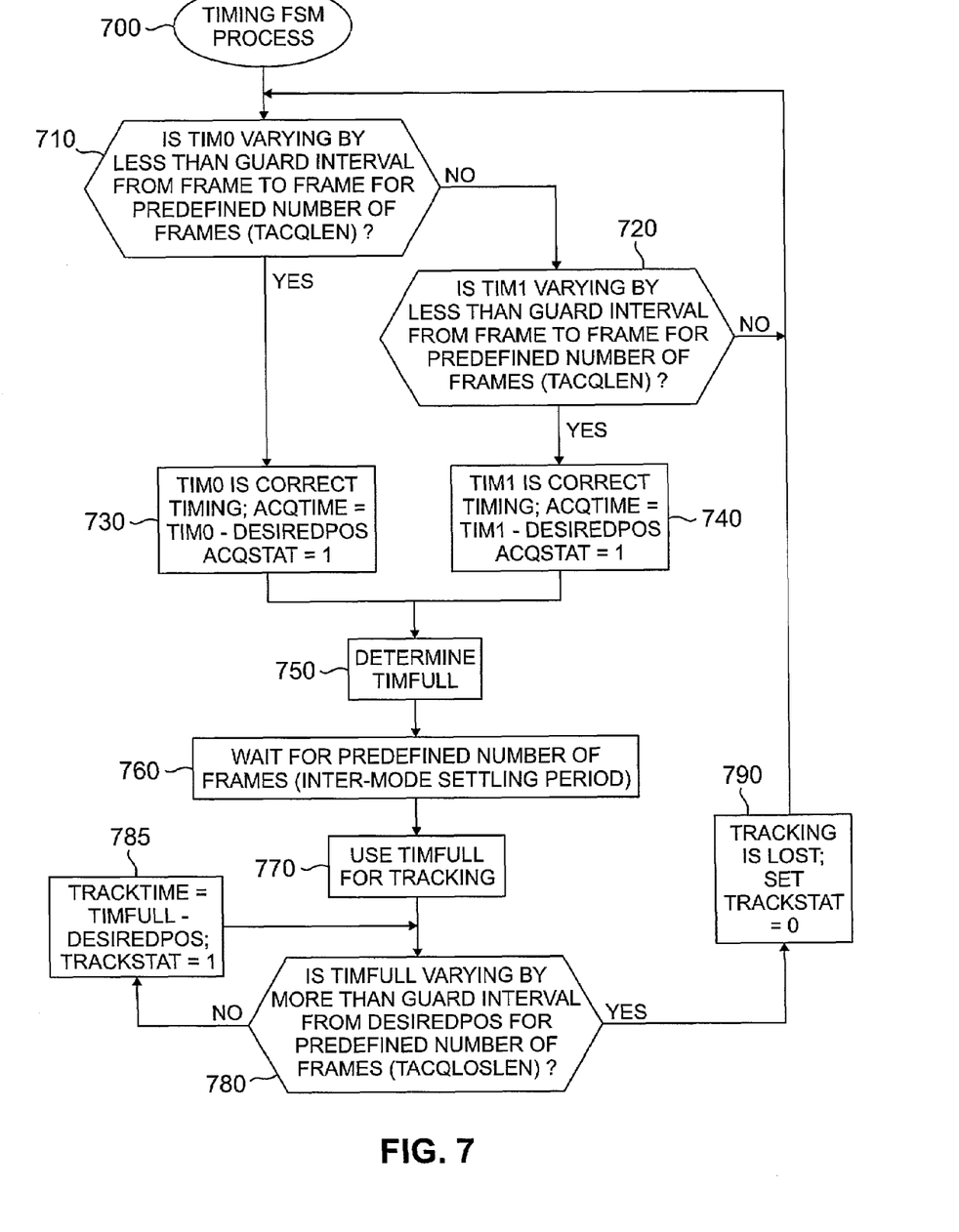
FIG. 7 is a flow chart describing a timing FSM process implemented by the receiver shown in FIG. 4.

FIG. 7 is a flow chart describing the timing FSM process 700 implemented by the receiver 400 shown in FIG. 4. As shown in FIG. 7, the timing FSM process 700 initially performs a test during step 710 to determine if the timing estimate, tim0, varies by less than the guard interval from frame to frame for a predefined number (tacqlen) of frames. If it is determined during step 710 that the timing estimate, tim0, varies by less than the guard interval from frame to frame for a predefined number (tacqlen) of frames then the timing estimate, tim0, is the correct timing, the variable ACQTIME is established as the difference between the timing estimate, tim0, and the desired position, DesiredPos, and the status bit ACQSTAT is set to one (indicating the acquisition mode) during step 730.

If, however, it is determined during step 710 that the timing estimate, tim0, does not vary by less than the guard interval for a predefined number (tacqlen) of frames then a further test is performed during step 720 to determine if the timing estimate, tim1, varies by less than the guard interval for a predefined number (tacqlen) of frames. If it is determined during step 720 that the timing estimate, tim1, varies by less than the guard interval for a predefined number (tacqlen) of frames then the timing estimate, tim1, is the correct timing, the variable ACQTIME is established as the difference between the timing estimate, tim1, and the desired position, DesiredPos, and the status bit ACQSTAT is set to one (indicating the acquisition mode) during step 740.

The variable $tim_{full}$ indicating the index for the maximum correlation in the 2232-sample buffer, is determined during step 750. Thereafter, the timing FSM process 700 waits for a predefined number of frames during step 760 to permit the timing FSM 450 to settle. The variable $tim_{full}$ is established as the timing estimate during step 770. A test is performed during step 780 to determine if the timing estimate, timfull, varies by more than the guard interval from the desired position, DesiredPos, for a predefined number (tacqloslen) of frames. If it is determined during step 780 that the timing estimate, timfull, varies by more than the guard interval from the desired position, DesiredPos, for a predefined number (tacqloslen) of frames, then tracking is lost and the status bit TRACKSTAT is set to a binary value of zero (0) during step 790 and program control returns to step 710 to reacquire timing.

If, however, it is determined during step 950 that the timing estimate, timfull, does not vary by more than the guard interval from the desired position, DesiredPos, for a predefined number (tacqloslen) of frames, then the OFDM frame is realigned with the desired position, DesiredPos, if necessary, and the status bit TRACKSTAT is set to a binary value of one (1) to maintain the timing FSM 450 in the tracking mode during step 785.

It is to be understood that the embodiments and variations shown and described herein are merely illustrative of the principles of this invention and that various modifications may be implemented by those skilled in the art without departing from the scope and spirit of the invention.

I claim:

1. A method for processing a signal in a communication system receiver, said method comprising the steps of:
   receiving said signal;
   correlating said signal with itself in a time domain to identify a peak in a correlation value in each frame; and
   aligning said peak with a desired position within said frame, said desired position being removed from a frame boundary.

2. The method according to claim 1, wherein said desired position is a central position in said frame.

3. The method according to claim 1, further comprising the step of establishing a plurality of windows in each frame during an acquisition mode and determining a peak in a correlation value in each of said windows.

4. The method according to claim 3, further comprising the step of selecting a timing estimate associated with a peak in a correlation value in one of said windows for timing purposes if said timing estimate satisfies at least one predefined condition.

5. The method according to claim 4, wherein said at least one predefined condition ensures that said timing estimate does not vary by more than a guard interval for a predefined number of frames.

6. The method according to claim 5, further comprising the step of declaring that timing has been acquired when said at least one predefined criteria is satisfied.

7. The method according to claim 1, further comprising the step of declaring that timing has been lost during a tracking mode when said peak varies from said desired position by more than a guard interval in said signal for more than a predefined number of frames.

8. The method according to claim 1, wherein said correlating step determines the maximum likelihood (ML) metric of said signal.

9. The method according to claim 1, wherein said correlating step is performed at a lag of the useful symbol duration.

10. The method according to claim 1, wherein said signal is an OFDM signal.

11. The method according to claim 1, wherein said signal is a DMT signal.

12. The method according to claim 1, wherein said aligning step further comprises the step of inserting or deleting samples.

13. The method according to claim 1, further comprising the step of interpolating said received signal to adjust a timing to within fractional sampling instances.

14. A method for processing a signal in a communication system reciever, said method comprising the steps of:
receiving said signal;
identifying a peak in a correlation value in each frame; and
aligning said peak in a time domain with a desired position within said frame, said desired position being removed from a frame boundary.

15. The method according to claim 14, wherein said desired position is a central position in said frame.

16. The method according to claim 14, further comprising the step of establishing a plurality of windows in each frame during an acquisition mode and determining a peak in a correlation value in each of said windows.

17. The method according to claim 16, further comprising the step of selecting a timing estimate associated with a peak in a correlation value in one of said windows for timing purposes if said timing estimate satisfies at least one predefined condition.

18. The method according to claim 17, wherein said at least one predefined condition ensures that said timing estimate does not vary by more than a guard interval for a predefined number of frames.

19. The method according to claim 18, further comprising the step of declaring that timing has been acquired when said at least one predefined criteria is satisfied.

20. The method according to claim 14, further comprising the step of declaring that timing has been lost during a tracking mode when said peak varies from said desired position by more than a guard interval in said signal for more than a predefined number of frames.

21. The method according to claim 14, wherein a correlating step determines the maximum likelihood (ML) metric of said signal.

22. The method according to claim 14, wherein said identifying step further comprises the step of correlating said signal with itself at a lag of the useful symbol duration to identify a peak in a correlation value in each frame step.

23. The method according to claim 14, wherein said aligning step further comprises the step of inserting or deleting samples.

24. The method according to claim 14, further comprising the step of interpolating said received signal to adjust a timing and down-sample.

25. A receiver for receiving a signal, comprising:
a maximum index locator to identify a peak in a correlation value in each frame of said received signal; and
an alignment block for aligning said peak in a time domain with a desired position within said frame, said desired position being removed from a frame boundary.

26. The receiver according to claim 25, wherein said desired position is a central position in said frame.

27. The receiver according to claim 25, wherein a peak in a correlation value is identified in a plurality of windows in each frame during an acquisition mode.

28. The receiver according to claim 27, wherein a timing estimate associated with a peak in a correlation value in one of said windows is selected for timing purposes if said timing estimate satisfies at least one predefined condition.

29. The receiver according to claim 28, wherein said at least one predefined condition ensures that said timing estimate does not vary by more than a guard interval for a predefined number of frames.

30. The receiver according to claim 29, wherein timing is acquired when said at least one predefined criteria is satisfied.

31. The receiver according to claim 25, wherein timing is lost during a tracking mode when said peak varies from said desired position by more than a guard interval in said signal for more than a predefined number of frames.

32. The receiver according to claim 25, wherein said maximum index locator determines the maximum likelihood (ML) metric of said signal.

33. The receiver according to claim 25, wherein said maximum index locator operates at a lag of the useful symbol duration.

34. The receiver according to claim 25, wherein said signal is an OFDM signal.

35. The receiver according to claim 25, wherein said signal is a DMT signal.

36. The receiver according to claim 25, wherein said alignment block aligns said peak by inserting or deleting samples.

37. The receiver according to claim 25, further comprising an interpolator to adjust a timing and down-sample said received signal.

* * * * *